United States Patent
Hieb et al.

(10) Patent No.: US 9,712,778 B2
(45) Date of Patent: Jul. 18, 2017

(54) MULTI-TUNER DEVICE INTEGRATION

(71) Applicant: ECHOSTAR TECHNOLOGIES L.L.C., Englewood, CO (US)

(72) Inventors: Eric Hieb, Parker, CO (US); Paul Langer, Westminster, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/590,701

(22) Filed: Jan. 6, 2015

(65) Prior Publication Data
US 2015/0195478 A1 Jul. 9, 2015

Related U.S. Application Data

(60) Provisional application No. 61/924,181, filed on Jan. 6, 2014.

(51) Int. Cl.
| | |
|---|---|
| *H04N 7/18* | (2006.01) |
| *H04N 5/50* | (2006.01) |
| *H04H 40/90* | (2008.01) |
| *H04N 21/41* | (2011.01) |
| *H04N 21/432* | (2011.01) |
| *H04N 21/433* | (2011.01) |
| *H04N 21/436* | (2011.01) |
| *H04N 21/4363* | (2011.01) |
| *H04N 21/438* | (2011.01) |

(Continued)

(52) U.S. Cl.
CPC ............ *H04N 5/50* (2013.01); *H04H 40/90* (2013.01); *H04N 21/4135* (2013.01); *H04N 21/4325* (2013.01); *H04N 21/4334* (2013.01); *H04N 21/4383* (2013.01); *H04N 21/43615* (2013.01); *H04N 21/43632* (2013.01); *H04N 21/47217* (2013.01); *H04N 21/6143* (2013.01)

(58) Field of Classification Search
CPC ............ H04N 21/4135; H04N 21/432; H04N 21/4325; H04N 21/436; H04N 21/43615; H04N 21/43622; H04N 21/43632
USPC ........................................ 725/74, 78, 80, 82
See application file for complete search history.

(56) References Cited

U.S. PATENT DOCUMENTS

| | | | |
|---|---|---|---|
| 6,363,434 B1 * | 3/2002 | Eytchison | ............... H04L 12/24 375/E7.019 |
| 8,572,661 B2 | 10/2013 | Strong et al. | |
| 2004/0123097 A1 | 6/2004 | Ranjan | |

(Continued)

FOREIGN PATENT DOCUMENTS

WO  2009052650 A1   4/2009

OTHER PUBLICATIONS

International Search Report and Written Opinion dated Mar. 23, 2015 in PCT/US2015/010324.

*Primary Examiner* — James R Sheleheda
(74) *Attorney, Agent, or Firm* — LK Global

(57) ABSTRACT

A secondary television receiver device includes one or more television tuners that can be integrated into a whole-home television receiving system. The secondary device that is enhanced with tuner capability registers the tuners with a primary receiver, which allocates tuners from available sources as needed. The tuned video stream may be directed to the primary television receiver for storage, trick play or other features prior to re-transmission to the ultimate viewing device. Alternatively, the received video stream may be directly rendered to a video display attached to the enhanced secondary receiver.

17 Claims, 3 Drawing Sheets

Figure 1:
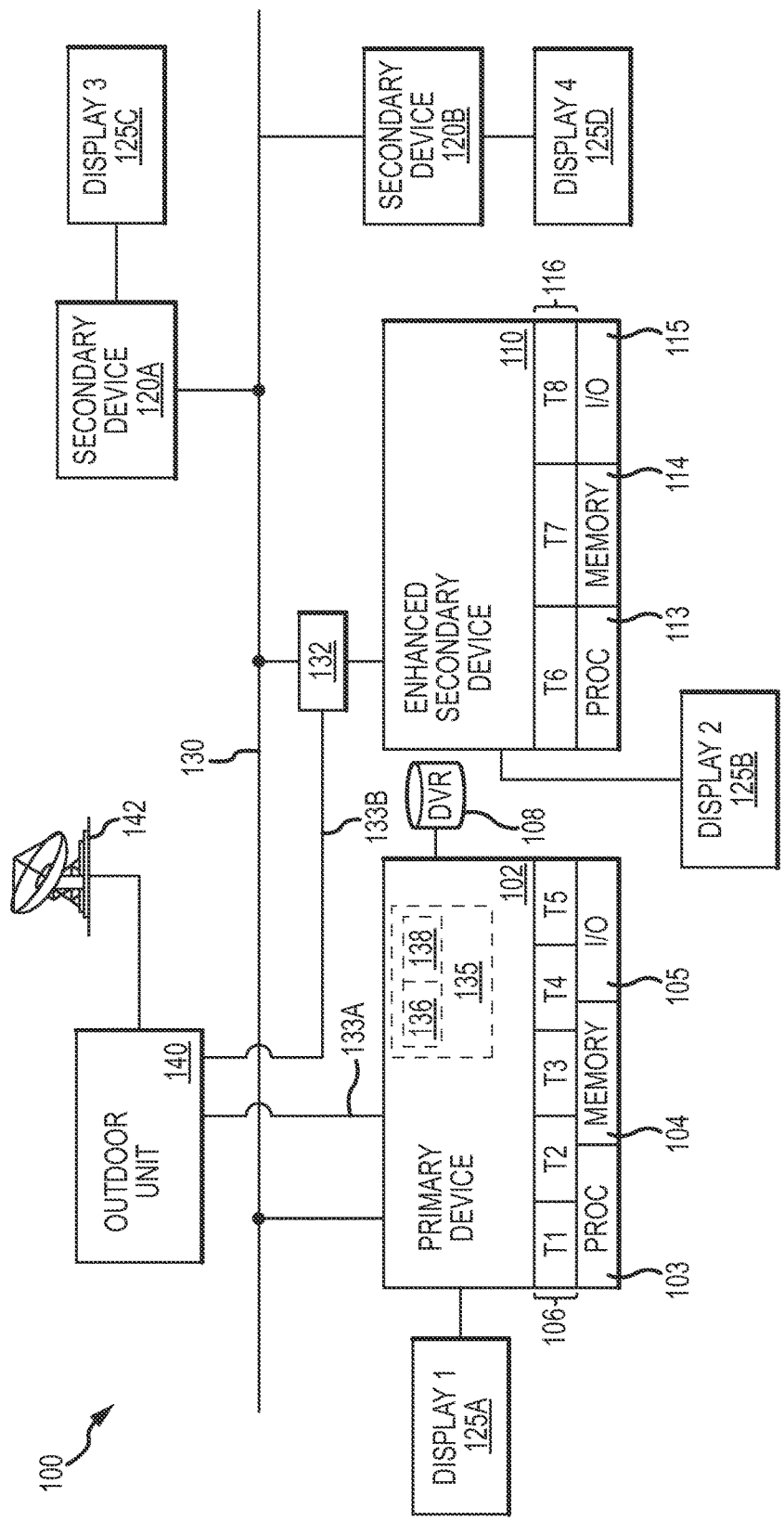

(51) Int. Cl.
*H04N 21/472* (2011.01)
*H04N 21/61* (2011.01)

(56) References Cited

U.S. PATENT DOCUMENTS

| | | | |
|---|---|---|---|
| 2004/0268407 A1* | 12/2004 | Sparrell | G06F 1/266 |
| | | | 725/116 |
| 2005/0002638 A1 | 1/2005 | Putterman et al. | |
| 2005/0097623 A1 | 5/2005 | Tecot et al. | |
| 2007/0050823 A1* | 3/2007 | Lee | H04L 12/2805 |
| | | | 725/80 |
| 2008/0120683 A1* | 5/2008 | Frazier | H04L 12/66 |
| | | | 725/141 |
| 2009/0222868 A1 | 9/2009 | Reynolds et al. | |
| 2009/0300697 A1 | 12/2009 | Hielscher et al. | |
| 2009/0320058 A1* | 12/2009 | Wehmeyer | H04N 7/17336 |
| | | | 725/31 |
| 2010/0211988 A1 | 8/2010 | Pettit et al. | |
| 2011/0030017 A1* | 2/2011 | Kostic | H04N 7/106 |
| | | | 725/85 |
| 2014/0282756 A1* | 9/2014 | Reichgott | H04N 21/47217 |
| | | | 725/88 |

* cited by examiner

MULTI-TUNER DEVICE INTEGRATION

PRIORITY CLAIM

This application claims priority to U.S. Provisional Patent Application Ser. No. 61/924,181, which was filed on Jan. 6, 2014 and is incorporated herein by reference.

TECHNICAL FIELD

The following discussion generally relates to reception of broadcast television programs, such as the reception of digital broadcast satellite (DBS) or other television broadcasts. More particularly, the following discussion relates to systems, methods and devices to integrate television tuners provided in separate components into a common television receiving system.

BACKGROUND

Most television viewers receive their television programming through a cable, direct broadcast satellite (DBS), IPTV or similar subscription-based service. To that end, television service is usually broadcast from a cable, DBS or other content aggregator to multiple subscribers. The subscribers may then view received content as live broadcasts, and/or may store the content on digital video recorders (DVRs) or the like for later viewing. Some viewers may also placeshift received content from their homes or other access points to mobile phones, tablets or other devices for remote viewing.

Recently, some television distributors have developed "whole home" television systems in which a central device with one or more television tuners, a digital video recorder (DVR) and/or other functions provides video streams to other secondary devices that are associated with particular televisions in the household or other premises. The HOPPER system available from Dish Network of Englewood, Colo., for example, uses a central device (the HOPPER device) as a television receiver that supplies video streams to secondary JOEY devices that are associated with particular televisions; other suppliers may provide similar systems, devices and features. Although such systems have been met with widespread customer approval, it is always beneficial to continually enhance the user experience and to provide additional new features for the users.

It is therefore desirable to increase the number of tuners available within a television receiving system, and to provide other enhancements to the viewer experience. Various desirable features and characteristics will become apparent from the subsequent detailed description and the appended claims, taken in conjunction with the accompanying drawings and this background section.

BRIEF SUMMARY

Various embodiments relate to systems, devices and/or methods to integrate television tuners located in primary and "enhanced secondary" devices. In various embodiments, a satellite, cable or other "whole home" television receiver/DVR video system allows television tuners present on separate devices to function as an integrated system.

In one embodiment, a method is executable by a primary television receiver device. The method suitably comprises receiving a registration message from a secondary television receiver device by the primary television receiver device, wherein the registration message describes at least one television tuner available from the secondary television receiver device; in response to the registration message, the primary television receiver device adding the at least one television tuner available from the secondary television receiver device to a list of available television tuners, wherein the list of available television tuners also comprises television tuners that are available from the primary television receiver device; and in response to a subsequent request for a television tuner received by the primary television receiver device, the primary television receiver device allocating the at least one television tuner available from the secondary television receiver device to service the request by receiving a television broadcast.

Other embodiments relate to a method executable by a television receiver device. The method suitably includes transmitting a registration message from the television receiver device to a primary television receiver, wherein the registration message describes at least one television tuner available from the television receiver device; receiving a subsequent request from the primary television receiver to allocate the at least one television tuner to receive a television broadcast; in response to the subsequent request received from the primary television receiver, to receive the television broadcast on the at least one television tuner; and providing a video stream of the television broadcast from the television receiver device for presentation of the television program to a viewer.

Still other embodiments provide an enhanced secondary television receiver device. The enhanced secondary television receiver device suitably comprises at least one television tuner, a cable interface to a coaxial cable, a display interface to a local display, and a processor. The processor is configured to transmit a registration message to a primary television receiver via the coaxial cable, wherein the registration message describes the at least one television tuner; receive a subsequent request from the primary television receiver via the coaxial cable to allocate the at least one television tuner to receive a television broadcast; in response to the subsequent request received from the primary television receiver, to control the at least one television tuner to receive the television broadcast; and provide a video stream of the television broadcast for presentation of the television program to a viewer.

Various other embodiments, aspects and other features are described in more detail below.

BRIEF DESCRIPTION OF THE DRAWING FIGURES

Figure 2:
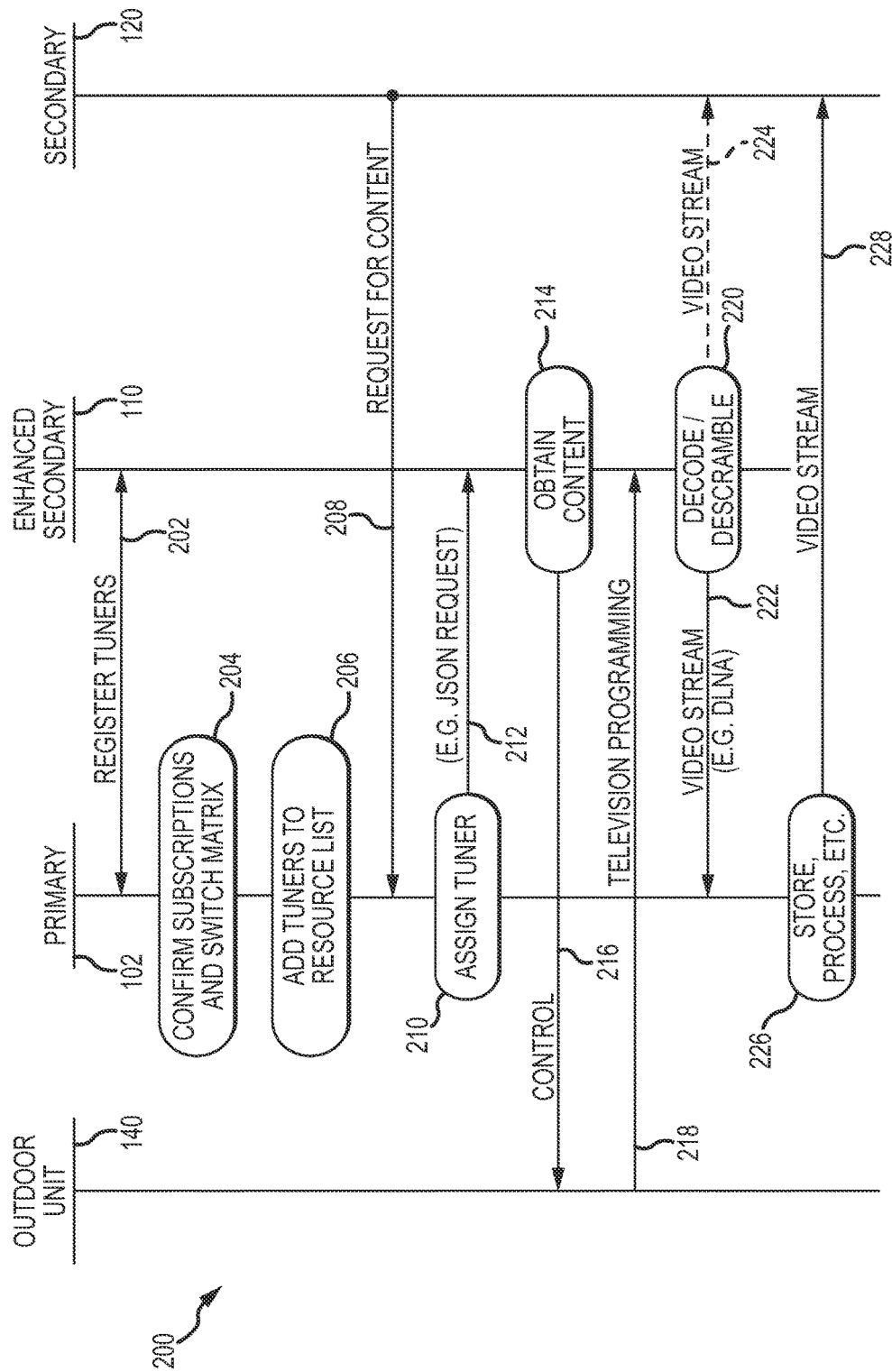
Figure 3:
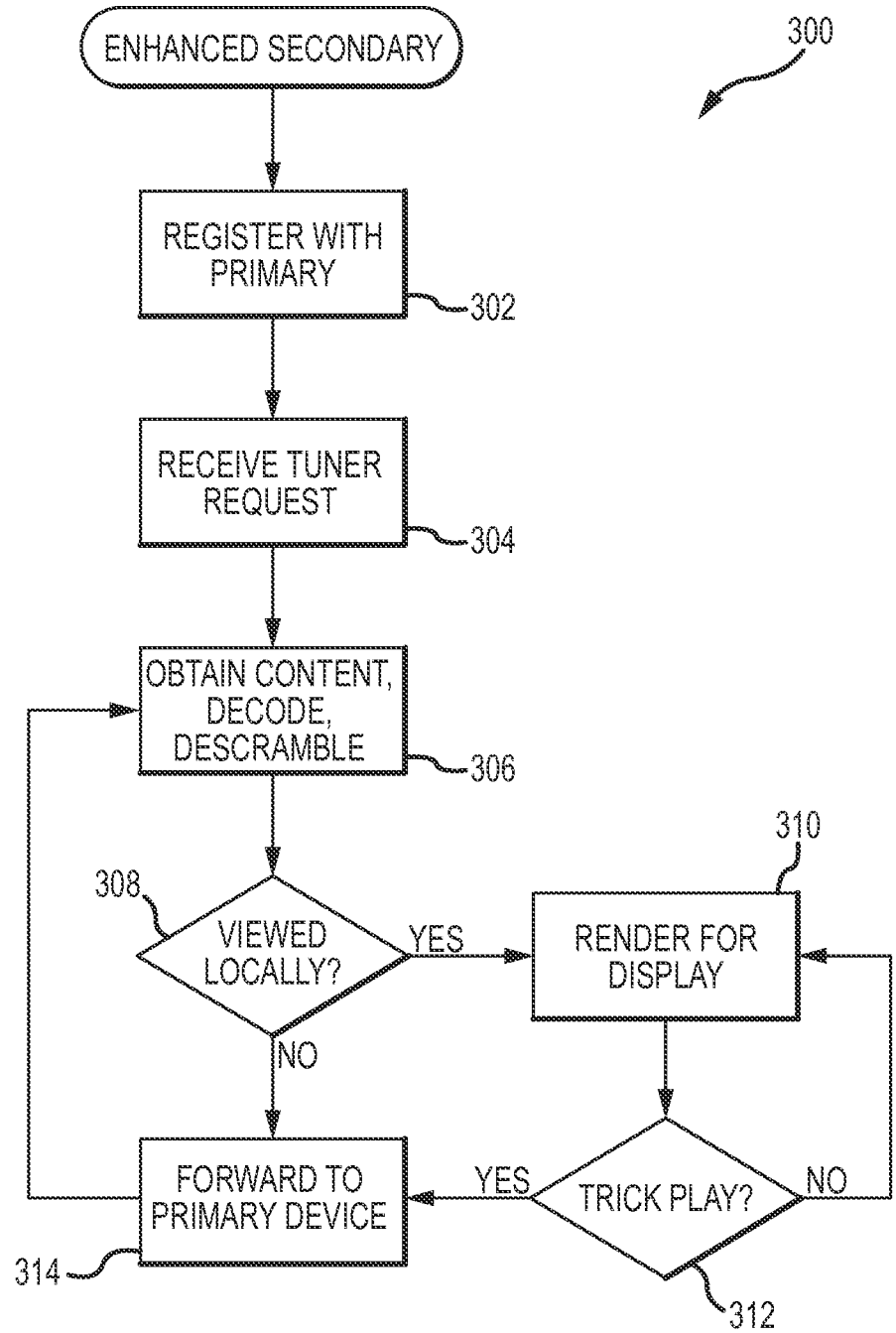

Exemplary embodiments will hereinafter be described in conjunction with the following drawing figures, wherein like numerals denote like elements, and FIG. 1 is a block diagram of an example television receiver system;

FIG. 2 is a diagram of an example process to operate and integrate a television receiver system; and FIG. 3 is a diagram of an example process to improve bandwidth usage within an integrated television receiver system.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Various embodiments of the following discussion relate to satellite, cable, IPTV, wireless and/or other "whole home" television receiver/DVR video systems in which television tuners present on multiple separate devices work together to function as an integrated system. Equivalent concepts could be applied in any number of products and settings available from any number of other suppliers.

A new type of secondary device that includes one or more television tuners acts as an add-on peripheral to expand the system's reception capabilities in a distributed fashion. This distribution of tuners within the system may be more cost effective in comparison to centralizing all tuners in one server device. Various embodiments may be engineered for high performance, feature richness, elegant simplicity, high manufacturability, and high reliability to support the desires of a demanding customer base, as appropriate. Again, other embodiments could use other resources, components or other features as desired.

Various embodiments are able to provide the same video experience to the customer's TV as legacy products in similar video networks. This enables the new "enhanced secondary" device to seamlessly blend into the legacy eco-system while providing valuable added satellite tuner capacity to simultaneously support more live TV sessions or recordings. Given its functional similarity to a legacy client, the new enhanced secondary hardware appearance could be modeled after the legacy enclosure, possibly with a slightly larger enclosure for the additional tuner hardware, with an optional full-sized smart card and built-in power supply, thereby avoiding an external power brick supply. Other embodiments may be differently packaged, constructed or housed as desired.

Various embodiments therefore provide a television client device that operates like a legacy client device to the customer but that additionally includes one or more satellite or other television tuners that are available to other devices within the system. This enables the primary device to effectively expand its television tuner capacity behind the scenes from its internal tuners (e.g., 5 tuners in FIG. 1) to combine with additional tuners available from the enhanced secondary device (e.g., 3 more tuners in FIG. 1), thereby increasing capacity for more simultaneous live TV viewing sessions and recordings available to every TV in the television system. The number of programs that could be simultaneously managed could be further increased in systems in which single tuners manage multiple program streams, as desired.

The enhanced secondary device provides an innovative way to increase system tuner capacity in proportion to the number of supported TVs in the home, instead of burdening primary devices with additional tuners that are not needed by those homes having fewer TVs. The flexibility of the system architecture enables the introduction of the enhanced secondary device as an add-on peripheral to expand the system's reception capabilities in a distributed fashion in a more cost effective manner in comparison to centralizing all tuners in a server. This can enable options that are more accurately tailored to meet the customer's viewing needs at affordable rates.

Various embodiments allow the viewer to experience the same entertainment features on the new "enhanced" client as on any of the legacy clients. This could include, for example, features such as DVR playback, commercial hopping, place-shifting, and/or the like. Some embodiments could also bring applications such as games, news, social media, weather and the like. A remote control location feature may also be provided.

MoCA connectivity provides easy connectivity using the home's existing coaxial cabling for communication to the main whole-home system and simple Internet connectivity when the whole-home system is connected. Various embodiments of the components described herein may be designed to be Energy Star 3.0 compliant or otherwise energy efficient so users may benefit from annual power consumption savings compared to having a complete HD DVR receiver at every TV.

Turning now to the drawings and with reference to FIG. 1, an exemplary "whole home" television viewing system 100 suitably includes a primary device 102 with a processor 103, memory 104, input/output resources 105, and any number of television tuners 106 (shown as T1-T5 in FIG. 1; an actual embodiment may have 3 tuners, or any other number of on-board tuners). System 100 also includes any number of secondary devices 120A-B having appropriate processors, memory and input/output features for receiving video streams and for rendering television content to a television or other appropriate display 125. These features could include a cable interface to a MoCA or similar network 130, a Wi-Fi/Ethernet or other network interface, an HDMI/S-Video/component/composite or other display interface, and/or the like. A conventional system might allow television signals received via a cable, satellite, IPTV or other head end to be decoded and appropriately distributed throughout the viewer's home for display on any number of different televisions.

FIG. 1 also shows a new enhanced secondary device 110 (also called a "super secondary device") that includes a processor 113, memory 114 and input/output 115 conventionally found on a legacy secondary device 120, but with the addition of one or more television tuners 116. FIG. 1 shows the enhanced secondary device 110 as having three additional tuners T6-T8, although other embodiments may equivalently provide one tuner, two tuners, or any number of additional tuners 116 as desired. Like a traditional secondary device 120, the enhanced secondary device no may include a cable interface to a MoCA or similar network 130; a television/video display interface to an HDMI/S-Video/component/composite display; and/or additional or alternate features (e.g., a network interface to a wired or wireless network) as appropriate.

In the embodiment illustrated in FIG. 1, the enhanced secondary device 110 is coupled to the primary receiver 102 and/or any number of secondary receivers 120A-B via a MoCA or other coaxial network 130. In some embodiments, this cable network could also connect to the antenna 142, point-of-presence or other outdoor unit (ODU) 140. In the embodiment of FIG. 1, however, primary receiver and/or enhanced secondary receivers are coupled to the antenna 140 and ODU 142 by one or more separate connections 133A-B to preserve bandwidth on the MoCA/coaxial network 130. Other embodiments could provide wireless communications, or hardwired connections via twisted pair or other wiring other than coaxial cables.

The example of FIG. 1 shows the enhanced secondary device no coupled to the ODU 140 via a first cable 133B and to the remaining devices 102, 120A-B via a second cable 130 representing the MoCA coaxial network. Enhanced secondary device 110 could have multiple coaxial or other cable ports to support the multiple connections, or, in other implementations, a single coaxial port on the enhanced secondary device 110 can communicate with both cables 133B and 130 through the use of a coaxial integrator 132, as desired.

The additional tuners 116 now provided on the enhanced secondary device no can be integrated with the tuners of the primary device 102 for allocation as desired within the whole-home environment 100. Rather than expanding the number of on-board tuners 106 found in the primary device 102 that may already be located in the environment 100, then, the enhanced secondary tuners 116 can augment or supplement the resources available within the entire system 100.

To that end, the primary receiver 102 typically executes control instructions 135 that may be stored as software, firmware or the like in memory 104 or other digital storage available to the primary receiver 102. These instructions 135 are executed on a processor 103 located within the primary receiver 102.

In an example embodiment, the control software 135 includes a resource manager module 136 and a session manager module 138 among many other modules for controlling the various functions of device 102. The resource manager 136 tracks and allocates resources within system 100, including any tuners 116 present on enhanced secondary devices 110 or the like, as well as any DVRs 108, placeshifting encoders, or other resources that may be available on any devices operating within the system 100. The session manager module 138 tracks video streaming sessions with each tuner 106, 116 as well as other functions of the system.

FIG. 2 shows a flow diagram of an example process 200 in which television programming signals are received and processed within system 100. The various functions shown in FIG. 2 may be performed by software, firmware or other programmable instructions stored within and executed by the various components of FIG. 1, as appropriate.

The tuners 116 of the enhanced secondary device no are integrated with the tuners 106 of the primary receiver 102 in any manner (function 202). In the example of FIG. 1, the enhanced secondary device 110 transmits a broadcast on the MoCA network 130 to be discovered by the primary device 102. In other embodiments, the primary device 102 could transmit a broadcast on the MoCA network 130 that prompts any enhanced secondary devices 110 to reply. In either case, the enhanced secondary device no reports to the primary device 102 that it has one or more available tuners 116 that can be integrated into system 100.

In various embodiments, the enhanced secondary device no further reports its subscription information and switch matrix information to the primary to ensure that the secondary device no is used within the same subscription and same receiver environment as the primary device (function 204). Subscription information may be stored on a smartcard, RFID chip, memory and/or other storage device on enhanced secondary device 110. The primary device 102 suitably verifies that the enhanced secondary tuners 116 are able to operate within the common environment 100; if so approved, then the tuners 116 of the enhanced secondary 110 are added to the resource list (function 206) of the primary receiver 102. This resource list may be maintained, for example, by the resource manager module 136 discussed above. Tuners or other resources on the resource list may be used as needed to perform subsequent tasks. These tasks are typically assigned by the primary receiver 102, e.g., using the session manager module 138.

If a television viewer using display 125D requests a live broadcast, for example, the regular secondary receiver 120B associated with the viewer's display 125D suitably notifies the primary receiver 102 that a tuner 106, 116 needs to be allocated to the desired live broadcast. This is shown in FIG. 2 as request 208. In various embodiments, sessions may be additionally or alternatively initiated by DVR timer events occurring within the primary device 102 or DVR 108, or by other events that may not be in direct response to user inputs, as appropriate.

When a tuner resource is needed to service a request for a live broadcast, one of the tuners 106, 116 in system 100 is allocated as appropriate (function 210). The tuners 116 of the enhanced secondary device no are typically allocated on the same basis as those of the primary device 102; that is, the tuners 116 are simply added to a "pool" of available tuners that are allocated as needed. Various embodiments may give preference to those tuners 106 located on the primary receiver 102 to preserve bandwidth on the MoCA network 130, as desired.

If a tuner 116 on the enhanced secondary device no is allocated, the primary device 102 sends an appropriate notification 212 to the enhanced secondary to direct the operation of the tuner. In various embodiments, notification 212 is a Java Service Over Network (JSON) request to a resource manager process executing in the enhanced secondary device 110 (e.g., on processor 113), although other embodiments may implement this feature in any other way.

The allocated tuner 116 receives the requested content as appropriate (function 214). In various embodiments, the enhanced secondary device 110 provides control instructions 216 to the ODU 140 or antenna 142 to receive an appropriate transponder signal; equivalent embodiments may communicate with a cable head end or other receiver device to obtain live cable or terrestrial broadcasts in any other way. In other embodiments, the primary device 102 manages the ODU 140, and the appropriate signal is already present on the ODU connection 133B to the enhanced secondary device 110. Television programming is therefore received at the enhanced secondary from the ODU 140, antenna 142, head-end or other source as appropriate (function 218). This content may be decoded, descrambled, transcoded and/or otherwise processed as desired (function 220) by the enhanced secondary device 110 rather than the primary device 102.

Content received by the enhanced secondary device 110 is then transmitted as a video stream over the coaxial/MoCA network 130 (or the like). In various embodiments, the received content is formatted as a DLNA (digital living network alliance) stream or the like, although other embodiments may use differently formatted streams of any type.

The received content stream may be transmitted directly to the secondary receiver (function 224), in some embodiments, to preserve bandwidth on the MoCA network (or other distribution network within the home environment). If a user requests a live television broadcast, this broadcast can be live streamed to the appropriate secondary device 120 to permit live viewing. In some embodiments, enhanced secondary device 110 includes a DVR or other storage feature that would allow trick play or other features while the stream is being sent directly to the secondary device coupled to the viewer's television.

In many embodiments, however, the enhanced secondary device may lack a storage feature. In such embodiments, the video stream 222 is instead transmitted over the MoCA network to the primary receiver 102, which is able to store the streamed content (function 226) in a DVR 108, to transcode the content for placeshifting, to process fast forward/rewind or other trick play features, or to perform other processing 226 as desired. In such embodiments, the primary receiver 102 suitably forwards the video stream 228 to the appropriate secondary device 110, 120 for decoding and rendering to the viewer's display 125 as desired. Note that some implementations may need to provide a DLNA or similar client on the primary receiver 102, since prior implementations may not have had a need to receive video streams via the MoCA network 130 from other devices 110.

Some embodiments could therefore initially allow direct streaming 224 from the enhanced secondary device 110 to the viewer's secondary device 110 or 120 to preserve bandwidth on the MoCA network. If a viewer is watching a display 125B that is directly connected (e.g., using an HDMI or similar connection) to the enhanced secondary device 110, the imagery may be conveniently decoded and presented directly by the enhanced secondary device no without the need to transport a video stream on network 130. When the viewer requests a pause, rewind or other trick play feature, however, then the stream 224 may be replaced with a stream 222/228 that passes through the primary receiver 102 to facilitate DVR storage and other features that may not be present on the enhanced secondary device 110. Timing information (e.g., a presentation time stamp (PTS) or the like may be passed from the enhanced secondary device no to the primary receiver 102 and/or the receiving secondary device 120 to permit consistent timing of the video streams during the adjustment.

Substantial amounts of bandwidth on network 130 can be conserved when live video streams are viewed directly, without being sent through the primary device 102. With reference now to FIG. 3, an example process 100 executable by an enhanced secondary device no suitably includes the broad steps of registering with the primary device 102 (function 302), obtaining requested content (function 306), and providing local viewing (function 310) or trick-play enabled viewing (function 314) as appropriate. Process 300 may be performed by software or firmware logic residing in memory 114 and executed by processor 113 of enhanced secondary device 110, as appropriate. Other embodiments may perform process 300 using other processing hardware or software resources available to enhanced secondary device 110.

As noted above, the enhanced secondary device 110 registers at startup, system initiation and/or at other appropriate times by sending a registration message 202 to the primary device 102 via network 130 (function 302). The registration may be initiated by the enhanced secondary device no and/or sent in response to prompting from primary device 102, as appropriate. In many implementations, the message 202 will describe the number of tuners 116 available from enhanced secondary device 110, as well as any other capabilities or features (e.g., a DVR or placeshifting capabilities) that may be available from the device 110.

When a tuner request message 212 is received from the primary device 102 (function 304), the enhanced secondary device 110 controls the assigned tuner 116 to obtain the desired content (function 306). In some embodiments, tuners 116 may be directly controllable within the device 110 without external control from primary device 102; that is, the enhanced secondary device 110 may be able to function in a standalone mode in some implementations. In other embodiments, however, the secondary receiver 110 operates solely in conjunction with a primary device 102, as desired.

Content is obtained, decoded, descrambled or otherwise processed as appropriate (function 306). As described above, primary device 102 and/or the enhanced secondary device 110 may interact with a head-end, IPTV server, antenna 142, ODU 140 or other source of television programming to obtain the requested content. The received content may be tuned, demodulated, decoded, descrambled or otherwise processed as appropriate to create a media stream that can be transmitted on network 130 and/or rendered for presentation on a local display 125.

In embodiments wherein the viewer is watching a television display 125 that is attached to the enhanced secondary device 110, it may be possible to at least temporarily process the requested content locally without transmitting a stream on network 130 (function 308). In such cases, the enhanced device 110 suitably decodes the received video content and provides the decoded content for presentation on display 125B similar to a legacy secondary device 120, as appropriate (function 310). Content may be provided via HDMI, component video, composite video, S-video or other cable that directly interconnects the device 110 to display 125B, as appropriate. Other embodiments may use wireless delivery or other delivery mechanisms as desired.

Some embodiments of enhanced device 110 may include a digital video recorder or similar feature, even if such capabilities are limited to buffering live content for a relatively short period of time (e.g., on the order of a few minutes or so). In many implementations, however, the enhanced secondary device 110 will not have a DVR or similar recording feature, thereby making trick play (e.g., fast forward, rewind, freeze frame, etc.) substantially more difficult, if not impossible. If the viewer is watching a live television broadcast that is received and rendered locally on the enhanced secondary device 110, it may become beneficial (if not necessary) to transmit a stream 222 to primary device 102 to make use of additional features available from the primary device 102 (function 314). As noted above, content tuned on one of the tuners 116 associated with an enhanced secondary device no may be rendered for presentation on a locally-attached display 125B until such additional features are requested (function 312). When the additional capabilities of primary device 102 are requested, then the PTS or other timing data can be used to synchronize the video handoff to primary device 102 so that the transition is as seamless as possible to the viewer. This allows for conservation of bandwidth on network 130 when enhanced DVR, trick play or other services are not requested while preserving the ability to provide such services as requested by the viewer.

The general concepts set forth herein therefore describe an enhanced secondary device that includes one or more television tuners that can be integrated into a whole-home viewing environment. By incorporating tuner features into the secondary client-type device, legacy primary devices can remain in service for a longer time and the service capabilities of the system as a whole can be more accurately tailored to the needs of particular customers. Various embodiments may provide alternate or additional benefits.

The above discussion often refers to a "MoCA network" for convenience. Equivalent embodiments could replace the MoCA network 130 with any other coaxial, twisted pair, cabled or wireless network or other connection, as desired. Also, although the foregoing discussion focuses primarily on direct broadcast satellite receiver systems for convenience, equivalent embodiments could be implemented within cable, IPTV, terrestrial broadcast and/or other media distribution systems, as desired.

As used herein, the word "exemplary" means "serving as an example, instance, or illustration." Any implementation described herein as "exemplary" is intended as an example that is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A method executable by a primary television receiver device, the method comprising:
   receiving a registration message via a first data connection from a secondary television receiver device by the primary television receiver device, wherein the registration message describes at least one television tuner available from the secondary television receiver device;
   in response to the registration message, the primary television receiver device adding the at least one television tuner available from the secondary television receiver device to a list of available television tuners, wherein the list of available television tuners also comprises television tuners that are available from the primary television receiver device;
   in response to a subsequent request for a television tuner received by the primary television receiver device, the primary television receiver device allocating the at least one television tuner available from the secondary television receiver device to service the request by receiving a television broadcast via a second data connection between the secondary television receiver device and an outdoor unit that is separate from the first data connection; and
   subsequently receiving, by the primary television receiver device via the first data connection, a request to perform a trick play feature on the television broadcast, and, responsive to the request, accepting a hand off of decoding from secondary television receiver device to the primary television receiver to thereby obtain the television broadcast at the primary television receiver via a third data connection between the primary television receiver and the outdoor unit for decoding of the television broadcast and processing of the trick play feature requested by the viewer by the primary television receiver and transmission of the decoded television broadcast to the secondary television receiver via the first data connection, wherein the handing off comprises the primary television receiver receiving timing information about the video stream from the secondary television receiver device to thereby maintain consistent timing of the video stream as the decoding of the video stream is handed off from the secondary television receiver device to the primary television receiver.

2. The method of claim 1 wherein the secondary television receiver device is an enhanced television receiver device, and wherein the subsequent request is received by the primary television receiver device from a different television receiver device that is separate and distinct from the enhanced television receiver device.

3. The method of claim 2 wherein the first data connection that transmits the registration message and the subsequent request is a network that interconnects the primary television receiver device, the enhanced television receiver device and the different television receiver device.

4. The method of claim 3 further comprising the primary television receiver:
   receiving a video stream from the at least one tuner available from the secondary television receiver via the network;
   processing the video stream by the primary television receiver; and
   forwarding the video stream to the different television receiver device via the network.

5. The method of claim 4 wherein the processing of the video stream by the primary television receiver comprises storing the video stream in a digital video recorder.

6. The method of claim 4 wherein the processing of the video stream by the primary television receiver comprises storing the video stream in a digital video recorder to thereby allow trick play of the video stream when the video stream is forwarded to the different television receiver device.

7. The method of claim 3 wherein the network is implemented over a coaxial cable.

8. The method of claim 1 wherein the allocating by the primary television tuner occurs without regard to whether the available tuners are physically located on the primary television receiver or on the secondary television receiver.

9. A method executable by a secondary television receiver device, the method comprising:
   transmitting a registration message from the secondary television receiver device to a primary television receiver via a first data connection, wherein the registration message describes at least one television tuner available from the secondary television receiver device;
   receiving a subsequent request from the primary television receiver via the first data connection to allocate the at least one television tuner of the secondary television receiver to receive a television broadcast;
   receiving, in response to the subsequent request received from the primary television receiver, the television broadcast via a second data connection to an outdoor unit for decoding of the television broadcast by the at least one television tuner of the secondary television receiver device, wherein the second data connection is separate from the first data connection;
   providing a video stream of the television broadcast decoded by the television tuner of the secondary television receiver for presentation of the television program to a viewer of a television connected to the secondary television receiver;
   subsequently receiving, by the secondary television receiver, a request from the viewer for a trick play feature, and, responsive to the request, handing off decoding of the video stream from the secondary television receiver device to the primary television receiver for processing of the trick play feature requested by the viewer, wherein the handing off comprises transmitting timing information about the video stream during processing of the trick play feature to thereby maintain consistent timing of the video stream as the video stream is handed off from the secondary television receiver to the primary television receiver;
   subsequently receiving the decoded television program from the primary television receiver via the first data connection; and
   subsequently providing the decoded television program for presentation to the viewer on the television connected to the secondary television receiver.

10. The method of claim 9 wherein the providing comprises providing the video stream of the television broadcast to the primary television receiver for storage in a digital video recorder at the primary television receiver.

11. The method of claim 9 wherein the providing comprises rendering the video stream received on the first connection for presentation on a local display that is directly connected to the television receiver device.

12. The method of claim 11 wherein the rendering on the local display directly connected to the secondary television receiver device continues until the trick play feature is requested by the viewer, and wherein the processed video stream is subsequently received via the first connection from the primary television receiver by the secondary television receiver device and rendered for presentation to the viewer on the local display by the secondary television receiver device.

13. A television receiver device comprising:
   at least one television tuner;
   a cable interface to a first coaxial cable and a second coaxial cable;
   a display interface to a local display; and
   a processor configured to:
      transmit a registration message to a primary television receiver via the first coaxial cable, wherein the registration message describes the at least one television tuner;
      receive a subsequent request from the primary television receiver via the first coaxial cable to allocate the at least one television tuner to receive a television broadcast;
      control, in response to the subsequent request received from the primary television receiver, the at least one television tuner to receive the television broadcast from an outdoor unit via the second coaxial cable and to decode the television broadcast; and
      provide a video stream of the decoded television broadcast for presentation of the television program to a viewer, wherein the video stream is initially rendered for presentation until a trick play feature is requested by the viewer, and wherein the television receiver device responds to the viewer requesting the trick play feature by handing off the decoding of the television broadcast to the primary television receiver so that the primary television receiver receives the television broadcast from the outdoor unit instead of the television receiver device, and wherein the television receiver device subsequently receives the decoded video stream via the first coaxial cable from the primary television receiver rather than the second coaxial cable from the outdoor unit, and wherein the handing off comprises transmitting timing information from the television receiver device to the primary television receiver via the first coaxial cable to thereby maintain consistent timing of the video stream as the decoding of the video stream is handed off from the television receiver device to the primary television receiver device.

14. The television receiver device of claim 13 wherein the decoded video stream of the television broadcast is additionally provided to the primary television receiver via the first coaxial cable for storage in a digital video recorder at the primary television receiver.

15. The television receiver device of claim 14 wherein the television broadcast is received from the outdoor unit of a direct broadcast satellite system via the second coaxial cable.

16. The television receiver device of claim 13 wherein the video stream is rendered for presentation on the local display that is directly connected to the television receiver device via the display interface.

17. The television receiver device of claim 13 wherein the registration message, the subsequent request and the video stream are transmitted across a MoCA network implemented on the first coaxial cable.

* * * * *